(12) United States Patent
Kumar et al.

(10) Patent No.: US 12,511,131 B2
(45) Date of Patent: Dec. 30, 2025

(54) SERVER DEVICE TO FACILITATE OPTIMUM AGGREGATE DATA SOURCE PROCESS UNIT BASED ON SET OF HARDWARE THRESHOLD METRICS

(71) Applicant: HONEYWELL INTERNATIONAL INC., Charlotte, NC (US)

(72) Inventors: Surinder Kumar, Bangalore (IN); Rod Stein, Edmonton (CA); Sivasankari Shanmugham, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 264 days.

(21) Appl. No.: 18/379,666

(22) Filed: Oct. 13, 2023

(65) Prior Publication Data

US 2025/0123849 A1  Apr. 17, 2025

(51) Int. Cl.
*G06F 9/4401* (2018.01)
*G06F 8/65* (2018.01)

(52) U.S. Cl.
CPC .............. *G06F 9/4411* (2013.01); *G06F 8/65* (2013.01)

(58) Field of Classification Search
CPC ................... G06F 9/4411; G06F 8/65
See application file for complete search history.

(56) References Cited

U.S. PATENT DOCUMENTS

| 8,849,431 B2 * | 9/2014 | Thomson ........... G05B 19/0426 700/87 |
| 10,733,087 B2 * | 8/2020 | Wiener ............... G06F 11/3698 |
| 10,819,722 B2 * | 10/2020 | Dhakshinamoorthy ..................... G06F 21/6218 |
| 12,372,949 B2 * | 7/2025 | Götz ......................... G06F 8/71 |
| 2023/0229675 A1 * | 7/2023 | Hautyunyan ......... H04L 43/024 |

\* cited by examiner

*Primary Examiner* — Tammara R Peyton

(57) ABSTRACT

Techniques for optimized aggregation of a data source are described. A server device receives a request from a data source for aggregating thereof and compares each of a set of hardware metrics corresponding to hardware configuration of the server device with a corresponding threshold hardware metric. The server device is classified as a small-configuration device or a high-configuration device and complete aggregation of the data source or partial aggregation of the data source is allowed based on the classification. A set of utilized hardware metrics of the server device that corresponds to hardware resources of the server device that is being utilized is determined. One or more operations corresponding to the transmission of data of the data source that is to be performed by the server device is blocked if at least one of the set of utilized hardware metrics is higher than a corresponding threshold operational soft limit.

20 Claims, 8 Drawing Sheets

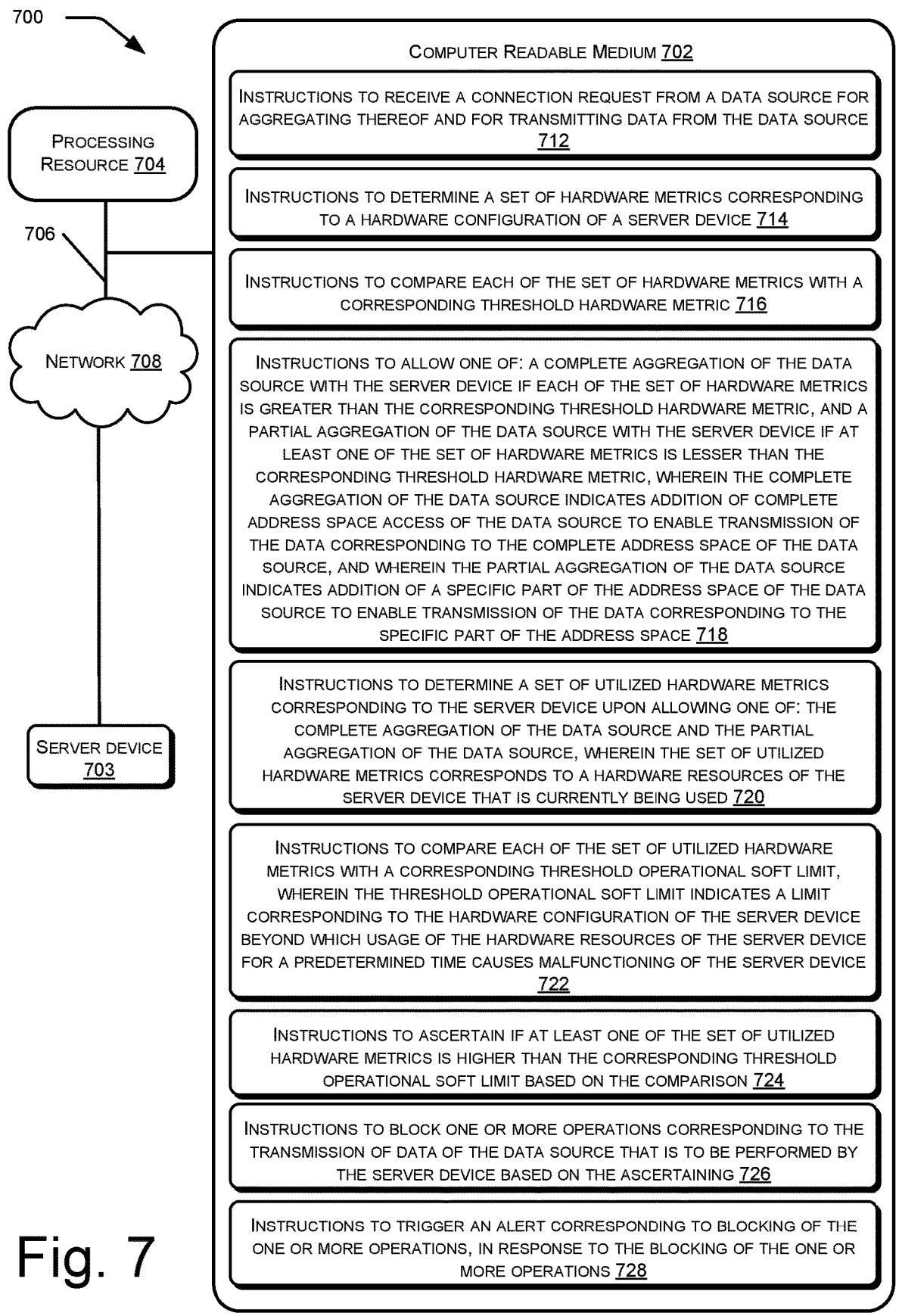

SERVER DEVICE TO FACILITATE OPTIMUM AGGREGATE DATA SOURCE PROCESS UNIT BASED ON SET OF HARDWARE THRESHOLD METRICS

BACKGROUND

Generally, industries include, manufacturing plants, warehouses, and factories, that may employ devices, such as sensors, controllers, automation systems, data servers, and the like, for various purposes. For instance, an industrial plant for manufacturing a component may include an automation system to automate one or more processes corresponding to the manufacturing of the product, a controller to set manufacturing parameters corresponding to the manufacturing of the component and/or to monitor operating environment of the component, and the like. The data from these devices may have to be stored so that it can be used, at a later stage, for subsequent analysis. In certain cases, the data may be stored locally, for instance, on the premises, in a server to perform processing of the data at a later stage. In certain other cases, instead of storing the data locally, the data may be stored on a remote device, such as a cloud server. In this regard, the data may be transmitted from the on-premise devices to the cloud server through a network, such as Local Area Network (LAN), Wide Area Network (WAN), intranet, internet, wireless access networks, mobile networks, the like.

Each of the devices may have to communicate with each other or communicate with the server, such as a local server, or a cloud server. However, each of the devices may have a different communication protocol. For instance, an automation system may have one type of communication protocol and a controller may have another type of communication protocol. Accordingly, to establish communication among the devices and with the cloud servers, Open Platform Communication Unified Architecture (OPCUA) communication protocol may be used. The OPCUA is a platform-independent, service-oriented, machine-to-machine communication protocol architecture that standardizes the communication protocol to establish communication among various devices having different communication protocols. In this regard, a plurality of OPCUA-based servers may be used. Each of the OPCUA-based servers may be connected to one or more of the devices, such as sensors, controllers, automation systems, data servers, and the like.

SUMMARY

In the present subject matter, a server device may be used for optimized aggregation of data sources. The server device may be employed in industries, including manufacturing plants, warehouses, factories, and the like. The data sources may be, for example, OPCUA-based servers, sensors, control units, automation systems, or a combination thereof, employed in the industries that include data for storage, transmission, and subsequent analyses. The server device may be, for example, a data broker that is to aggregate data from a plurality of data sources for transmission of the data from the plurality of data source. The server device may be, for example, an OPCUA-based data broker.

The server device may receive a connection request from a data source for the aggregation thereof and for transmitting data from the data source. Upon receiving the request, the server device may be classified as a small-configuration device or a high-configuration device. For the classification, the hardware configuration of the server device may be determined. Particularly, the server device may determine a set of hardware metrics that correspond to the hardware configuration of the server.

In this regard, upon the determination, the server device may compare each of the set of hardware metrics with a corresponding threshold metric. In an example, if at least one of the set of hardware metrics is lesser than the corresponding threshold hardware metric, the server device may be classified as the small-configuration device. Accordingly, in such a case, only a partial aggregation of the data source may be allowed. The partial aggregation of the data source may correspond to addition of a specific part of the address space of the data source for transmission of the data from the specific part of the address space of the data source. In other words, based on a request of a user, a specific part of the data source address space may be allowed for browsing. In addition, the server device may provide an alert using a user interface to indicate the partial aggregation of the data source.

In another example, if each of the set of hardware metrics is higher than the corresponding threshold hardware metric, the server device may be classified as the high-configuration device. Accordingly, in such a case, a complete aggregation of the data source may be allowed. The complete aggregation of the data source may correspond to the addition of the complete address space access of the data source for the transmission of the data from the complete address space of the data source. In an example, the server device may provide an alert using the user interface to indicate the complete aggregation of the data source.

Further, in an example, upon classifying as the high-configuration device, it may be analyzed if hardware resources required for the complete aggregation of the data source are available with the server device prior to allowing the complete aggregation of the data source. In this regard, a set of available hardware metrics corresponding to the server device may be obtained. The set of available hardware metrics corresponds to a hardware configuration of the server device that is available for use.

The server device may determine a required set of threshold hardware metrics that correspond to hardware configuration required for the complete aggregation of the data source. In an example, the server device may determine the required set of threshold hardware metrics by browsing the complete address space of the data source. Further, the server device may compare each of the set of available hardware metrics with a corresponding threshold hardware metric from the required set of threshold hardware metrics. If each of the set of available hardware metrics is greater than the corresponding threshold hardware metrics from the required set of threshold hardware metrics, then the server device may allow the complete aggregation of the data source.

In another example, if at least one of the set of available hardware metrics is lesser than the corresponding threshold hardware metrics from the required set of threshold hardware metrics, then the server device may trigger an alert to indicate lack of the required set of hardware metrics for the complete aggregation of the data source. In an example, the indication may also include causing a user interface to indicate required update in the hardware configuration of the server device to allow the complete aggregation of the data source.

In an example, upon allowing the complete aggregation of the data source or the partial aggregation of the data source, use of hardware resources of the server device for the transmission of the data may be continuously monitored. In this regard, the server device may determine a set of utilized hardware metrics corresponding to the server device. The set of utilized hardware metrics corresponds to hardware resources of the server device that is being utilized. Further, each of the set of utilized hardware metrics may be compared with a corresponding threshold operational soft limit. The threshold operational soft limit may indicate a limit corresponding to the hardware configuration of the server device beyond which usage of the hardware resources of the server device for a predetermined time causes malfunctioning of the server device.

The server device may block one or more operations corresponding to the transmission of data of the data source that is to be performed by the server device if at least one of the set of utilized hardware metrics is higher than the corresponding threshold operational soft limit of the set of threshold operational soft limit. In particular, the server device may block resource intensive operations, such as exporting address space where file operation is involved, and the like.

In addition, in an example, the server device may trigger an alert corresponding to blocking of the one or more operations, in response to the blocking of the one or more operations. On the other hand, the server device may continue allowing the transmission of the data corresponding to the complete address space of the data source if each of the set of utilized hardware metrics is lesser than the corresponding threshold operational soft limit.

Further, upon allowing the partial aggregation of the data source or the complete aggregation of the data source, if a process other than the process corresponding to the data source utilizes hardware resources of the server device that is available for use, the server device may transmit an alert to indicate that the hardware resources that is available for use are being used by the process other than a process corresponding to the data source.

In an example, upon allowing the complete aggregation of the data source or the partial aggregation of the data source, the server device may continue to monitor if available hardware resources of the server device are being utilized by a process other than the process corresponding to the data source. In this regard, the server device may monitor the set of available hardware metrics corresponding to the server device. Further, it may be determined if the process other than a process corresponding to the data source utilizes the hardware resources that is available for use based on the monitoring. An alert may be triggered to indicate that the hardware resources that is available for use are being used by the process other than the process corresponding to the data source.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

FIG. 7 illustrates a computing environment, implementing a non-transitory computer-readable medium for optimized aggregation of a data source, according to an example implementation of the present subject matter.

DETAILED DESCRIPTION

Figure 1:
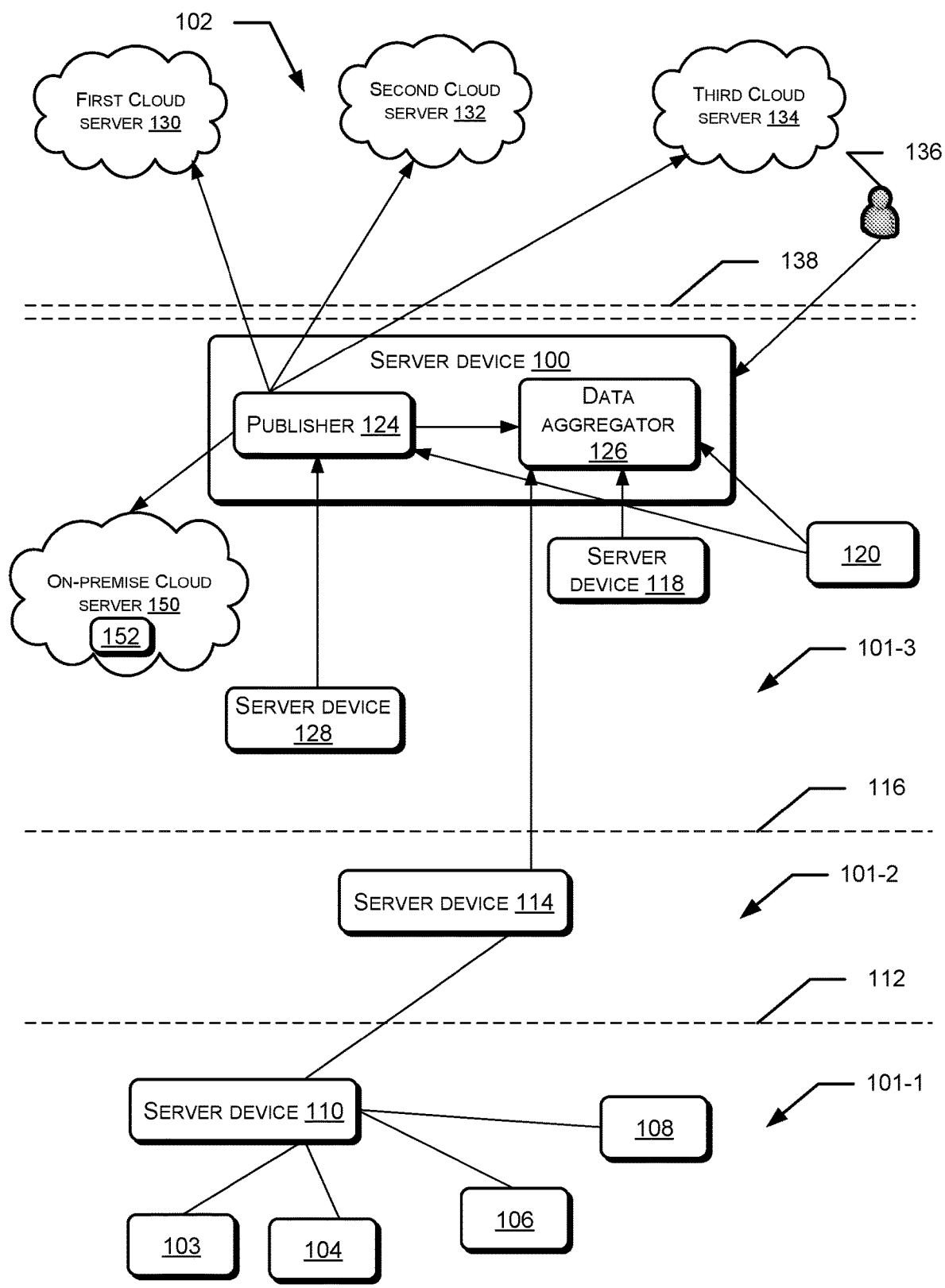
FIG. 1 illustrates a block diagram of a network architecture, according to an example implementation of the present subject matter.

Generally, industries, including, manufacturing plants, warehouses, factories, may employ devices, such as sensors, controllers, automation systems, data servers, and the like. To standardize communication protocol to establish communication among the devices, many OPCUA-based servers may be used at the premises of the industries. Accordingly, each of the OPCUA-based servers may be connected to one or more of the devices employed in the industries.

To enable secured communication among these devices, each of OPCUA-based servers may be protected using one or more firewalls. In some scenarios, data from most or all of the OPCUA-based servers may be required for the analyses of the data from the devices. Therefore, to connect to each of OPCUA-based servers, firewall protecting these servers may have to be opened. The opening of the firewall may compromise the security of the data and therefore, the devices may be prone to malware and phishing attacks. Accordingly, in some scenarios, the entire process carried out in the industry may malfunction due to such malware and phishing attacks.

To prevent security threats to the devices, data brokers that are to aggregate data from the OPCUA-based servers may be used. The data brokers may connect to one or more of the OPCUA-based servers for the aggregation of the data and provide a single point connection for transmission of the data from the OPCUA-based servers. Accordingly, the use of data brokers may eliminate the need for opening the firewall.

The data brokers may be implemented on a small-configuration device, such as an Internet-of-things (IOT)-based processing unit with smaller processing capabilities and small memory capabilities, or on a high-configuration device, such as a virtual machine with higher processing capabilities and high memory capabilities.

When multiple OPCUA-based data servers are connected to the data broker in scenarios where a data broker is installed on a small-configuration device, latency issues may be caused during the operation. This is because the small-configuration device may be handling more operational load than it is capable of. Assume that a data broker is implemented on a small IOT-based processing unit, with Random Access Memory (RAM) of 2 GB and the processing unit having two cores. Further, assume that the capability of the processing unit is to aggregate one data source with 10000 data attributes. In such a scenario, if two OPCUA-based servers, each having 10000 data attributes, are connected with the processing unit, the processing unit may witness decreased performance. This is because the processing unit is handling more than the load the processing unit can handle. Handling of such a higher load may lead to decreased efficiency, lesser performance, and heat generation during the operation of the data broker. In some scenarios, the handling of higher loads for a longer time may even cause crashing of the processing unit.

Similarly, a data broker may be installed on a high-configuration device. In such scenarios, higher number of OPCUA-based servers may be connected to the data broker. However, a user may not be aware of the number of OPCUA-based servers that can be connected with the data broker. In this regard, to follow a cautious approach, the user may connect only a lesser number of the OPCUA-based servers. Accordingly, multiple such data brokers may be configured for connecting several OPCUA-based servers. This may result in only minimal usage of the high-configuration device and thereby, result in wastage of resources. Assume that a processing unit has a RAM of 64 GB and has eight-cores. Further, assume that the design capability of the processing unit enables aggregation of 5 data sources with each data source having 100,000 data attributes. In such a scenario, only if two OPCUA-based servers, each having 10000 data attributes, are connected with the processing unit, the processing unit is under-utilized and results in wastage of resources of the processing unit.

The present subject matter relates to optimized aggregation of data sources. In accordance with the present subject matter, data sources may be optimally aggregated based on hardware configuration in which a server device for data source aggregation is implemented.

In an example, a server device may be used for optimized aggregation of data sources. The server device may be employed in industries, including manufacturing plants, warehouses, factories, and the like. The data sources may be, for example, OPCUA-based servers, sensors, control units, automation systems, or a combination thereof, employed in the industries that include data for storage, transmission, and subsequent analyses. The server device may be, for example, a data broker that is to aggregate data from a plurality of data sources for transmission of the data from the plurality of data source. The server device may be, for example, an OPCUA-based data broker. The server device may receive a connection request from a data source for the aggregation thereof and for transmitting data from the data source. The server device may be classified as a small-configuration device or a high-configuration device. The small-configuration device may be, for example, IoT gateway to fetch the data from the data sources of the industry. The high-configuration device may be, for example, virtual machines where vertical scaling is possible.

For the classification, the hardware configuration of the server device may be determined. Particularly, the server device may determine a set of hardware metrics that correspond to the hardware configuration of the server. The set of hardware metrics may be, for example, processing unit metrics, memory metrics, and the like. For example, the set of hardware metrics may be 64 GB of RAM and a processing unit having eight cores.

In this regard, upon the determination, the server device may compare each of the set of hardware metrics with a corresponding threshold metric. For instance, the server device may compare a processing unit metric with the threshold processing unit metric and the memory metric with the threshold memory unit metric. In an example, if at least one of the set of hardware metrics is lesser than the corresponding threshold hardware metric, then only a partial aggregation of the data source may be allowed. For instance, assume that the 2 GB of RAM and two-core processing unit are the threshold hardware metrics. Further, assume that the set of hardware metrics may include 64 GB of RAM and a processing unit having single core. In this regard, it may be ascertained that at least one of the set of hardware metrics (i.e., processing unit having single core) is lesser than the corresponding threshold hardware metrics (i.e., processing unit having two cores). Therefore, only partial aggregation of the data source may be allowed. The partial aggregation of the data source may correspond to addition of a specific part of the address space of the data source for transmission of the data from the specific part of the address space of the data source. In other words, based on a request of a user, the specific part of the address space of the data source may be allowed for browsing.

In addition, the server device may provide an alert using a user interface to indicate the partial aggregation of the data source. The alert may be in the form of, for example, a visual message. In an example, the alert may be provided via a user interface, such as a Graphical User Interface (GUI).

In another example, if each of the set of hardware metrics is higher than the corresponding threshold hardware metric, then a complete aggregation of the data source may be allowed. For instance, assume that the 2 GB of RAM and two-core processing unit are the threshold hardware metrics. Further, assume that the set of hardware metrics may include 64 GB of RAM and a processing unit having eight cores. In this regard, it may be ascertained that each of the set of hardware metrics is higher than the corresponding threshold hardware metrics. Therefore, the complete aggregation of the data source may be allowed. The complete aggregation of the data source may correspond to the addition of the complete address space access of the data source for the transmission of the data from the complete address space of the data source. In an example, the server device may provide an alert using the user interface to indicate the complete aggregation of the data source. The alert may be in the form of a visual message. In an example, the alert may be provided via the user interface, such as a Graphical User Interface (GUI).

Further, in an example, it may be analyzed if hardware resources required for the complete aggregation of the data source are available with the server device prior to allowing the complete aggregation of the data source. In this regard, a set of available hardware metrics corresponding to the server device may be obtained. The set of available hardware metrics corresponds to a hardware configuration of the server device that is available for use. For example, assume that the server device has 64 GB of RAM and an eight-core processing unit. However, only 32 GB of RAM and four cores are available for use. Then, the set of available hardware metrics may correspond to 32 GB RAM and four cores of processing unit.

The server device may determine a required set of threshold hardware metrics that correspond to hardware configuration required for the complete aggregation of the data source. In an example, the server device may determine the required set of threshold hardware metrics by browsing the complete address space of the data source. Further, the server device may compare each of the set of available hardware metrics with a corresponding threshold hardware metric from the required set of threshold hardware metrics. If each of the set of available hardware metrics is greater than the corresponding threshold hardware metrics from the required set of threshold hardware metrics, then the server device may allow the complete aggregation of the data source.

For instance, assume that the server device has 64 GB of RAM with a sixteen-core processing unit (i.e., the set of hardware metrics). Further, assume that the server device has 32 GB of RAM and four-cores of processing unit that is available for the aggregation of the data source (i.e., the set of available hardware metrics). Furthermore, assume that the data source may require 16 GB of RAM and a two-core processing unit (i.e., the required set of threshold hardware metrics). In this regard, the server device may ascertain that each of the set of available hardware metrics (i.e., 32 GB RAM and four-cores of processing unit) is greater than the corresponding threshold hardware metric from the required set of threshold hardware metric (i.e., 16 GB RAM and a two-core processing unit). Accordingly, in such a scenario, the server device may allow the complete aggregation of the data source.

In another example, if at least one of the set of available hardware metrics is lesser than the corresponding threshold hardware metrics from the required set of threshold hardware metrics, then the server device may trigger an alert to indicate lack of the required set of hardware metrics for the complete aggregation of the data source. The triggering of the alert may include prompting a message, such as a visual message, using the user interface. In an example, the prompting of the message may be performed using a Graphical User Interface (GUI).

For instance, assume that the server device has 64 GB of RAM with a sixteen-core processing unit (i.e., the set of hardware metrics). Further, assume that the server device has 16 GB of RAM and two-cores of processing unit that is available for the aggregation of the data source (i.e., the set of available hardware metrics). Furthermore, assume that the data source may require 32 GB of RAM and a four-core processing unit (i.e., the required set of threshold hardware metrics). In this regard, the server device may ascertain that each of the set of available hardware metrics (i.e., 16 GB RAM and two-cores of processing unit) is lesser than the corresponding threshold hardware metric from the required set of threshold hardware metric (i.e., 32 GB RAM and a four-core processing unit). In response to the ascertainment, the server may trigger the alert, as explained above.

In an example, upon allowing the complete aggregation of the data source or the partial aggregation of the data source, use of hardware resources of the server device for the transmission of the data may be continuously monitored. In this regard, the server device may determine a set of utilized hardware metrics corresponding to the server device. The set of utilized hardware metrics corresponds to hardware resources of the server device that is being utilized. Further, each of the set of utilized hardware metrics may be compared with a corresponding threshold operational soft limit. The threshold operational soft limit may indicate a limit corresponding to the hardware configuration of the server device beyond which the usage of the hardware resources of the server device for a predetermined time causes malfunctioning of the server device.

The server device may block one or more operations corresponding to the transmission of data of the data source that is to be performed by the server device if at least one of the sets of utilized hardware metrics is higher than the corresponding threshold operational soft limit of the set of threshold operational soft limit. In particular, the server device may block resource intensive operations, such as exporting address space where file operation is involved, and the like.

In addition, in an example, the server device may trigger an alert corresponding to blocking of the one or more operations, in response to the blocking of the one or more operations. In an example, the triggering of the alert may include prompting an indication corresponding to the blocking of the one or more operations in the form of a visual message using the user interface.

On the other hand, the server device may continue allowing the transmission of the data corresponding to the complete address space of the data source if each of the set of utilized hardware metrics is lesser than the corresponding threshold operational soft limit.

Further, upon allowing the partial aggregation of the data source or the complete aggregation of the data source, if a process other than the process corresponding to the data source utilizes hardware resources of the server device that is available for use, the server device may transmit an alert to indicate that the hardware resources that is available for use are being used by the process other than the process corresponding to the data source. The alert may be, for example, a visual message transmitted via the User Interface.

In an example, upon allowing the complete aggregation of the data source or the partial aggregation of the data source, the server device may continue to monitor if available hardware resources of the server device are being utilized by a process other than the process corresponding to the data source. Accordingly, the server device may monitor the set of available hardware metrics corresponding to the server device. Further, it may be determined if a process other than a process corresponding to the data source utilizes the hardware resources that is available for use based on the monitoring. An alert may be triggered to indicate that the hardware resources that is available for use are being used by the process other than the process corresponding to the data source. The alert may be, for example, a visual message and may be provided using, for example, the user interface.

The present subject matter provides an efficient and reliable techniques for optimized aggregation of data sources. In accordance with the present subject matter, data sources may be aggregated based on hardware configuration in which a server device for data source aggregation is implemented. Therefore, the present subject matter enables higher scalability, performance and reliability of the server device that is to perform data source aggregation. Since the aggregation is based on the hardware configuration, the present subject matter prevents decreased efficiency, latency issues, lesser performance, and heat generation during the operation caused due to aggregation of higher number of data sources to a server device implemented on the small-configuration device. Therefore, the present subject matter prevents crashing of the server device. Further, the present subject matter prevents wastage of resources that is caused due to aggregation of lesser number of data sources to a server device implemented on a high-configuration device.

FIG. 1 illustrates a block diagram of a network architecture 102, according to an example implementation of the present subject matter. The network architecture 102 may correspond to an architecture in an industry, including, manufacturing plants, warehouses, factories, and the like. The industries may employ entities, such as sensors, controllers, automation systems, data servers, and the like for various purposes. In an example, the data from these entities may have to be stored and transmitted for subsequent analysis. Accordingly, such entities may be sources of data and may, therefore, be referred to as data sources. In other words, the entities, such as sensors, controller, automations, systems, data servers, and the like may be referred to as the data sources.

In an industry, to enhance the data security and to prevent the various units in the industry from phishing and malware attacks, different layers are used in the network architecture 102 with varying degree of security. In an example, the network architecture 102 may include three layers, viz., a first layer 101-1, a second layer 101-2, and a third layer 101-3. The first layer 101-1 may be Process Control Network (PCN) layer, the second layer 101-2 may be a demilitarized zone (DMZ) layer, and the third layer 101-3 may be a corporate layer. Each of these layers 101-1-101-3 may be protected behind a firewall, such as a firewall 112, a firewall 116, and a firewall 138.

In an example, the PCN layer 101-1 may include the data sources, such as sensors 103, control units 104, automation systems 106, and OPCUA-based servers 108. The data sources 103, 104, 106, 108 in the PCN layer 101-1 may not be accessible to an outside network to prevent malware and phishing attacks on the data sources 103, 104, 106, 108. This may be useful in scenarios where security of data sources 103, 104, 106, 108 can be compromised by devices outside the PCN layer 101-1 and thereby, leading to compromise in the security of the industry. The data sources 103, 104, 106, 108 in the PCN layer 101-1 may be connected to a server device 110 that are to aggregate the data from the data sources 103, 104, 106, 108. The server device 110 may also be referred to as the data broker. The server device 110 in the PCN layer 101-1 may have only one way of communication. In other words, the server device 110 may only transmit the data and may not receive any data. The PCN layer 101-1 is protected behind the firewall 112. Further, the data sources, 103, 104, 106, 108 in the PCN layer 101-1 may communicate using OPCUA protocol. In this regard, the server device 110 may include an adapter (not shown in FIG. 1) to enable communication of the data sources 103, 104, 106, 108 with the server device 110 using the OPCUA protocol.

The DMZ layer 101-2 may include a server device 114 that are to receive data from the server device 110 of the PCN layer 101-1 and transmit the data to entities in the corporate layer 101-3. The server device 114 may also be a data broker. The server device 114 in the DMZ layer 101-2 may have two-way communication and may transmit and receive data. The DMZ layer 101-2 may be protected behind the firewall 116.

The corporate layer 101-3 may have two-way communication and may transmit and receive data. The corporate layer 101-3 may include the server device 100 which are to aggregate data from the server device 114 in the DMZ layer 101-2. Accordingly, the server device 100 may include a data aggregator 126. Particularly, the server device 100 may be, for example, OPCUA-based data aggregator to collect data from a plurality of data sources. In addition, the corporate layer 101-3 may include entities, such as sensors, control units and automation systems referred together by 120 in FIG. 1. Further, there may be one or more OPCUA-based servers 118, 128. The server device 100 may also aggregate the data from the entities 118, 120, 128 in the corporate layer 101-3. The server device 100 may also include an adapter to enable communication with the entities 118, 120, 128 in the corporate layer 101-3 in OPCUA communication protocol. Further, the corporate layer 101-3 enables transmission of the data to a cloud server, such as a first cloud server 130, a second cloud server 132, and a third cloud server 134. The first cloud server 130, the second cloud server 132, and the third cloud server 134 may be, for example, public cloud servers. Accordingly, the server device 100 may include a publisher 124 to publish data to the cloud servers 130, 132, 134. The corporate layer 101-3 may be protected behind the firewall 138.

In some scenarios, the data may not be transmitted to the public cloud servers, such as the first cloud server 130, the second cloud server 132, and the third cloud server 134 for various reasons, such as for the data security purposes, and the like. Instead, the data may have to be transmitted to a cloud server that is at the location of the industry. Accordingly, the corporate layer 101-3 may include an on-premise cloud server 150. Further, the on-premise cloud server 150 may include a Message Queuing Telemetry Transport (MQTT) broker 152 for receiving the data using MQTT communication protocol.

In an example, a user 136 may fetch data from the one or more data sources 103, 104, 106, 108, 118, 120, 128 in the industry from the server device 100 in the corporate layer 101-3. Accordingly, the server device 100 may provide a single point connection to fetch data corresponding to all the entities used in the industry at various network layers, such as the PCN layer 101-1, the DMZ layer 101-2, and the corporate layer 101-3. This prevents opening of the firewalls 112, 116, 138 for fetching the data. In an example, to fetch the data from the server device 100, a Graphical User Interface (not show in FIG. 1) may be used, as will be described in detail with reference to FIG. 3.

In the above example, only three layers are depicted in the network architecture 102. However, in other examples, there can be any number of layers in the network architecture 102. Further, in the above example, the PCN layer 101-1 and the DMZ layer 101-2 are explained to include only one server device 110 and 114 respectively. However, the PCN layer 101-1 and the DMZ layer 101-2 may include any number of server devices.

Figure 2:
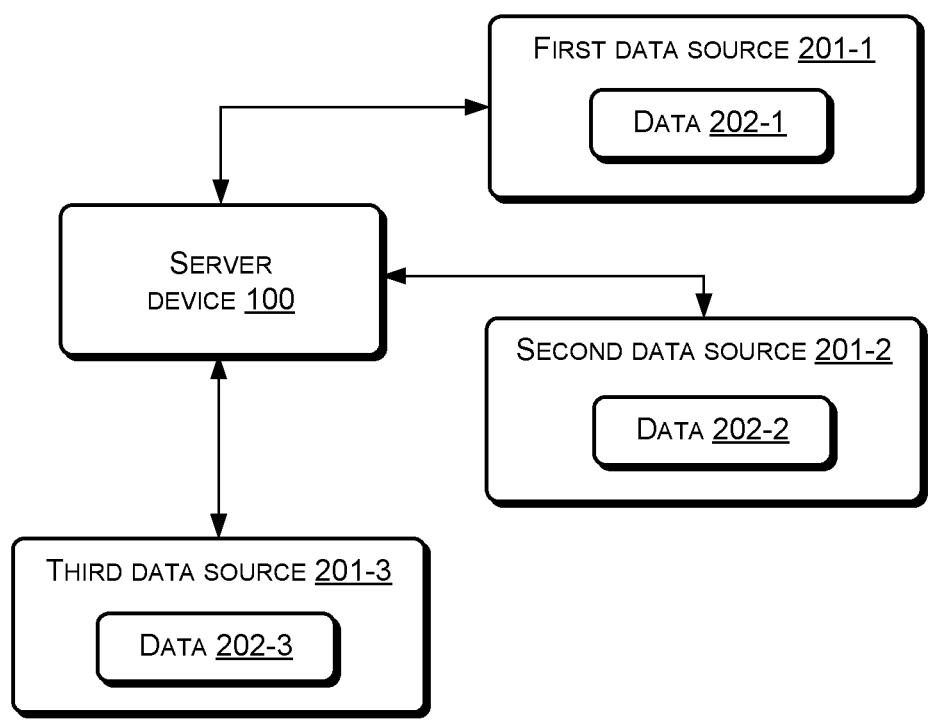
FIG. 2 illustrates a server device connected to data sources, according to an example implementation of the present subject matter.

FIG. 2 illustrates the server device 100 connected to data sources 201-1, 201-2, 201-3, according to an example implementation of the present subject matter. The server device 100 may connect to a plurality of data sources, such as a first data source 201-1, a second data source 201-2, and a third data source 201-3. The data sources 201-1, 201-2, 201-3 may correspond to the data sources 103, 104, 106, 108, 118, 128, 120.

The data sources 201-1, 201-2, 201-3 may be and/or may include a microprocessor, a microcomputer, a microcontroller, a digital signal processor, a central processing unit, a state machine, a logic circuitry, or a device that manipulates signals based on operational instructions. Among other capabilities, the processing unit may fetch and execute computer-readable instructions stored in a memory, such as a volatile memory or a non-volatile memory, of the server device.

Each of the data sources 201-1, 201-2 201-3 may include corresponding data 202-1, 202-2, 202-3 in the memory of the data source 201-1, 201-2, 201-3 that may have to be stored and/or transmitted for a subsequent analysis. For instance, the data from one or more of the data sources 201-1, 201-2, 201-3 may have to be aggregated by the server device 100. The aggregation may enable fetching of the data by the user 136 and/or transmission to cloud servers, 130, 132, 134, as explained with reference to FIG. 1

Hereinafter, the data source will be explained with reference to the data source 201-1. In an example, the server device 100 may determine hardware configuration of the server device 100 and may allow aggregation of the data source 201-1. Particularly, the server device 100 may allow partial aggregation of the data source 201-1 and/or the complete aggregation of the data source 201-1 based on the hardware configuration of the server device 100. The partial aggregation of the data source 201-1 may correspond to addition of a specific part of the address space of the data source 201-1 for transmission of the data from the specific part of the address space of the data source 201-1. In other words, based on a request of the user 136, a specific part of the data source address space may be allowed for browsing. The complete aggregation of the data source 201-1 may correspond to the addition of the complete address space access of the data source 201-1 for the transmission of the data from the complete address space of the data source 201-1. For example, assume that a sensor with 5000 data attributes is to be aggregated to the server device 100. In this regard, the hardware configuration of the server device 100. Based on the determination, the server device 100 may allow complete aggregation, which is access to 5000 data attributes of the sensor or may allow only partial aggregation, which is access to specific data attributes based on a request from the user 136.

To determine the hardware configuration of the server device 100, the server device 100 may determine a set of hardware metrics corresponding to the hardware configuration of the server device 100. The set of hardware metrics may be, for example, processing unit metrics, memory metrics, and the like. For example, the set of hardware metrics may indicate that the server device has 64 GB of RAM and a processing unit having eight cores. The number of cores of the processing unit may be indicative of clock rate (number of cycles executed by the processing unit per second) of the processing unit In an example, upon the determination, the server device 100 may compare the set of hardware metrics with a corresponding threshold software metric. For instance, the server device 100 may compare a processing unit metric with the threshold processing unit metric and the memory metric with the threshold memory unit metric. In an example, the threshold processing unit metric is a processing unit with 2 cores and the threshold memory unit metric is 2 GB of RAM In an example, if at least one of the set of hardware metrics is lesser than the corresponding threshold hardware metric, then the server device 100 may be classified as small-configuration device. In such a scenario, only the partial aggregation of the data source may be allowed. For instance, assume that the 2 GB of RAM and two-core processing unit are the threshold hardware metrics. Further, assume that the set of hardware metrics of the server device 100 may include 64 GB of RAM and a processing unit having single core. In this regard, it may be ascertained that at least one of the set of hardware metrics (i.e., processing unit having single cores) is lesser than the corresponding threshold hardware metrics (i.e., processing unit having two cores). Therefore, only partial aggregation of the data source 201-1 may be allowed. In other words, only specific part of the 5000 data attributes of the sensor may be aggregated based on a request from the user 136. The small-configuration device may be, for example, an Internet of Things (IoT) gateway to fetch the data from the data sources 201-1, 201-2, 201-3 of the industry.

In another example, if each of the set of hardware metrics is higher than the corresponding threshold hardware metric, the server device 100 may be classified as high-configuration device. In such a scenario, a complete aggregation of the data source 201-1 may be allowed. For instance, assume that the 2 GB of RAM and two-core processing unit are the threshold hardware metrics. Further, assume that the set of hardware metrics may include 64 GB of RAM and a processing unit having eight cores. In this regard, it may be ascertained that each of the set of hardware metrics is higher than the corresponding threshold hardware metrics. Therefore, the complete aggregation of the data source 201-1 may be allowed. In other words, the 5000 data attributes will be added to the server device 100 for transmission or access thereof. The high-configuration device may be, for example, a virtual machine with a vertical scaling possibility.

Upon aggregation of the data source 201-1, assume that another data source 201-2, such as a control unit, may have to be aggregated. In this regard, the server device 100 may check the available hardware resources and utilized hardware resources and may proceed to perform further steps, as will be discussed in detail with reference to FIGS. 4-6.

Figure 3:
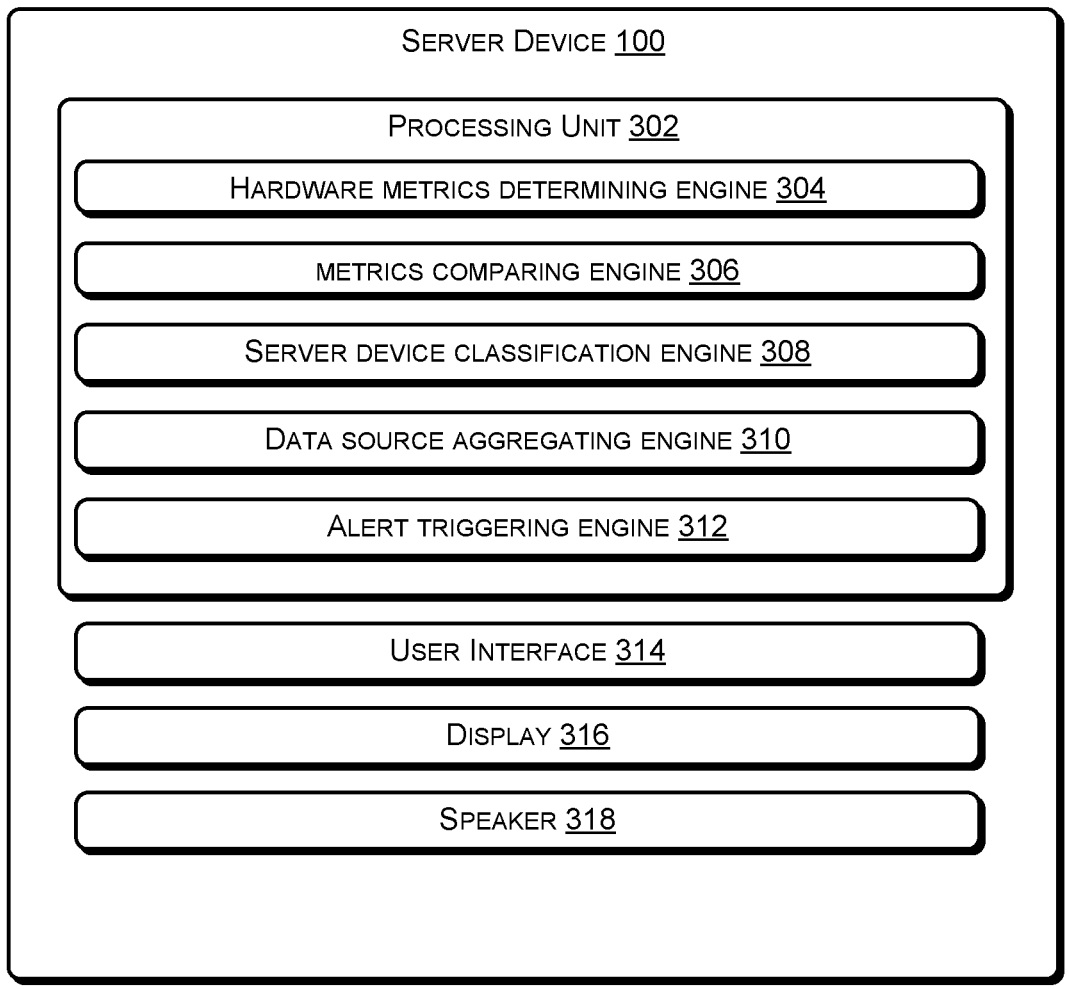
FIG. 3 illustrates a server device, according to an example implementation of the present subject matter.

FIG. 3 illustrates the server device 100, according to an example implementation of the present subject matter. The server device 100 can include a processing unit 302 to run at least one operating system and other applications and services. The server device 100 can also include an interface (not shown in FIG. 3) and a memory (not shown in FIG. 3). Further, the server device 100 can include one or more engines 304, 306, 308, 310, 312 and data.

The processing unit 302, amongst other capabilities, may be configured to fetch and execute computer-readable instructions stored in the memory. The processing unit 302 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processing unit", may be provided through the use of dedicated hardware as well as hardware capable of executing machine readable instructions.

When provided by the processing unit 302, the functions may be provided by a single dedicated processor, by a single shared processor, or by a plurality of individual processors, some of which may be shared. Moreover, explicit use of the term "processing unit" should not be construed to refer exclusively to hardware capable of executing machine readable instructions, and may implicitly include, without limitation, digital signal processor (DSP) hardware, network processor, application specific integrated circuit (ASIC), field programmable gate array (FPGA), read only memory (ROM) for storing machine readable instructions, random access memory (RAM), non-volatile storage. Other hardware, conventional and/or custom, may also be included.

The interface (not shown in FIG. 3) may include a variety of machine-readable instructions-based interfaces and hardware interfaces that allow the server device to interact with different entities, such as the processing unit 302, the engines 304, 306, 308, 310, 312 and the data (not shown in FIG. 3). Further, the interface may enable the components of the server device 100 to communicate with computing devices, web servers, and external repositories. The interface may facilitate multiple communications within a wide variety of networks and protocol types, including wireless networks, wireless Local Area Network (WLAN), RAN, satellite-based network, and the like.

The memory may be coupled to the processing unit 302 and may, among other capabilities, provide data and instructions for generating different requests. The memory can include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The engines 304, 306, 308, 310, 312 may include routines, programs, objects, components, data structures, and the like, which perform particular tasks or implement particular abstract data types. The engines 304, 306, 308, 310, 312 may further include modules that supplement applications on the server device 100, for example, modules of an operating system. Further, the engines 304, 306, 308, 310, 312 may be implemented in hardware, instructions executed by a processing unit, or by a combination thereof.

In an implementation, the engines 304, 306, 308, 310, 312 may be machine-readable instructions which, when executed by the processing unit 302, perform any of the described functionalities. The machine-readable instructions may be stored on an electronic memory device, hard disk, optical disk or other machine-readable storage medium or non-transitory medium. In one implementation, the machine-readable instructions can also be downloaded to the storage medium via a network connection.

The engines 304, 306, 308, 310, 312 may perform different functionalities. The engines 304, 306, 308, 310, 312 include a hardware metrics determining engine 304, a metric comparing engine 306, a server device classification engine 308, a data source aggregating engine 310, and an alert triggering engine 312. The functions of the engines 304, 306, 308, 310, 312 are explained below.

In an example, the hardware metrics determining engine 304 may determine the set of hardware metrics corresponding to the hardware configuration of the server device 100. Further, in an example, the hardware metric determining engine 304 may determine a set of utilized hardware metrics corresponding to the server device 100. The set of utilized hardware metrics corresponds to hardware resources of the server device 100 that is being utilized. For instance, assume that the hardware metrics of the server device 100 is 64 GB RAM and eight-core processing unit 302. Further, assume that the 32 GB RAM and four-cores are currently being utilized by the server device for one or more of existing processes run by the server device 100. In this regard, the set of utilized hardware metrics may be 32 GB RAM and four-cores of processing unit 302, which may be determined by the hardware metrics determining engine 304.

In an example, the hardware metric determining engine 304 may obtain a set of available hardware metrics. The set of available hardware metrics corresponds to a hardware configuration of the server device 100 that is available for use. In the above explained scenario, the set of available hardware metrics is 32 GB of RAM and four-cores of processing unit 302, which may be determined by the hardware metric determining engine 304.

Additionally, in some scenarios, the hardware metric determining engine 304 may determine a required set of threshold hardware metrics. The required set of threshold hardware metrics correspond to hardware configuration required for the complete aggregation of the data source 201-1. To determine a required set of threshold hardware metrics, the hardware metric determining engine 304 may browse a complete address space of the data source 201-1. Assume that sensor with 5000 data attributes are to be completely aggregated. In this regard, the hardware metric determine engine 304 may browse complete address space of the sensor and then determine the required set of threshold metrics.

The metrics comparing engine 306 may perform comparison of hardware metrics. The metrics comparing engine 306 may compare each of the set of hardware metrics with a corresponding threshold hardware metric to enable the classification of the server device 100 as the small-configuration device or the high-configuration device.

In an example, the metrics comparing engine 306 may compare each of the set of available hardware metrics with a corresponding threshold hardware metric from the required set of threshold hardware metrics to enable allowing the complete aggregation of the data source 201-1.

Further, upon allowing the complete aggregation of the data source 201-1, the metrics comparing engine 306 may compare each of the set of utilized hardware metrics with a corresponding threshold operational soft limit. The threshold operational soft limit indicates a limit corresponding to the hardware configuration of the server device 100 beyond which usage of the hardware resources of the server device 100 for a predetermined time causes malfunctioning of the server device 100 to continue allowing the operations of the data source 201-1 or blocking of operations of the data source 201-1. In an example, the threshold operational soft limit may be determined based on a hardware configuration of the server device 100 and may be determined dynamically.

The server device classification engine 308 may enable classification of the server device 100 into the small-configuration device or the high-configuration device based on the comparison of each of the set of hardware metrics with a corresponding threshold hardware metric.

The data source aggregating engine 310 may enable aggregation of the data source 201-1 based on the classification of the server device 100 as the small-configuration device or the high-configuration device. In particular, the data source aggregating engine 310 may enable complete aggregation or the partial aggregation of the data source 201-1. Further, in an example, the data source aggregating engine 310 may block one or more operations corresponding to the transmission of data of the data source 201-1 that is to be performed by the server device 100 if the at least one of the set of utilized hardware metrics is higher than the corresponding threshold operational soft limit. The data source aggregating engine 310 may continue to allow operations corresponding to the transmission of data of the data source 201-1 that is to be performed by the server device 100 if each of the set of utilized hardware metrics is lesser than the corresponding threshold operational soft limit.

In a particular example, the data source aggregating engine 310 may allow the complete aggregation of the data source 201-1 if each of the set of available hardware metrics is greater than the corresponding threshold hardware metric from the required set of threshold hardware metrics.

Further, the data source aggregating engine 310 may perform monitoring operations upon aggregating the data source 201-1. For instance, in an example, upon allowing the partial aggregation or the complete aggregation of the data source 201-1, the set of available hardware metrics corresponding to the server device 100 may be monitored by the data aggregation engine 310. Further, the data source aggregating engine 310 may determine if a process other than a process corresponding to the data source 201-1 utilizes the hardware resources that is available for use based on the monitoring and perform further actions, based on the determination, as will be explained with reference to FIGS. 4-6.

The alert triggering engine 312 may be for triggering an alert to, for example, the user 136 (not shown in FIG. 3) upon the complete aggregation of the data source 201-1 or the partial aggregation of the data source 201-1. The alert triggering engine 312 may trigger an alert to indicate lack of the required set of the threshold hardware metrics for the complete aggregation of the data source 201-1 if at least one of the set of available hardware metrics is lesser than the corresponding threshold hardware metric from the required set of threshold hardware metrics.

In an example, the alert triggering engine 312 may trigger an alert to indicate that the hardware resources that is available for use are being used by the process other than a process corresponding to the data source in response to the determination thereof.

In an example, to trigger the alert, the server device 100 may include a display 316, such as a Liquid Crystal Display (LCD), Light Emitting Diode (LED) display, touch display, and the like. In some examples, to trigger the alert, the server device 100 may include speaker 318.

The alert may be, for example, in form of a visual message provided using a user interface 314, such as a Graphical User Interface (GUI) on the display 316. In some examples, the alert may be in form of sound, such as a buzzer sound, an alarm, a ring tone, an audio message, and the like provided through the speaker 318.

The user Interface 314 may enable communication of the user 136 with the server device 100 to fetch data from the server device 100, to provide the alerts, and the like.

Figure 4:
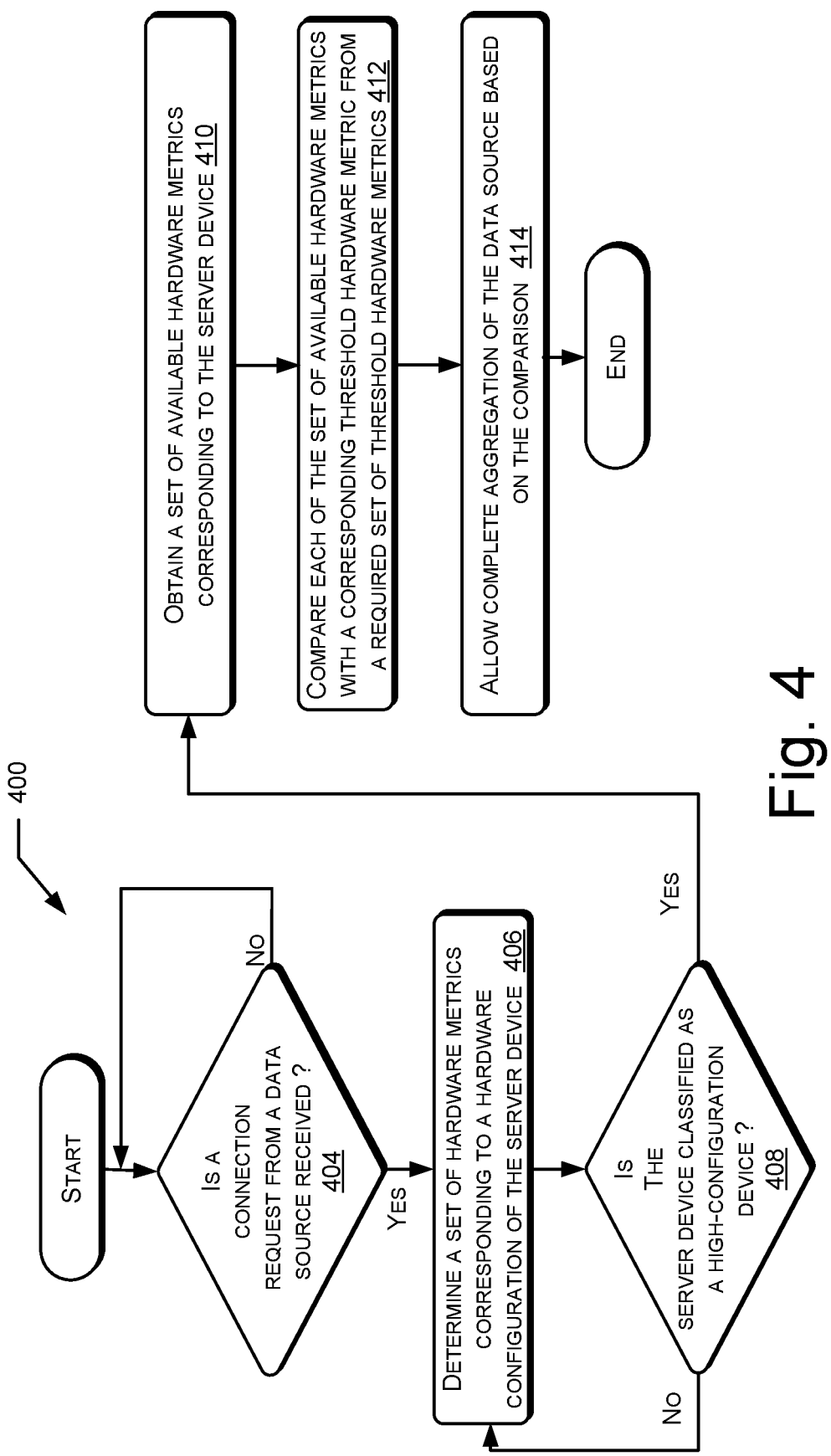
FIG. 4 illustrates a method for optimized aggregation of a data source for a high-configuration device, according to an example implementation of the present subject matter.

FIG. 4 illustrates a method 400 for optimized aggregation of data source 201-1 for a high-configuration device, according to an example implementation of the present subject matter. The order in which the method 400 is described is not intended to be construed as a limitation, and any number of the described method blocks may be combined in any order to implement the method 400, or an alternative method. Furthermore, the method 400 may be implemented by processor(s) or computing device(s) through any suitable hardware, non-transitory machine-readable instructions, or a combination thereof.

It may be understood that steps of the method 400 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 400 may be performed by the server device 100.

At step 404, the server device 100 may determine if a connection request is received from the data source 201-1. If the connection request is received, then step 406 is performed. If the connection request is not received, then step 404 may be repeated.

At step 406, to enable classification of the server device 100 as a high-configuration device, the server device 100 may determine a set of hardware metrics corresponding to hardware configuration of the server device 100. The set of hardware metrics may be, for example, processing unit metrics, memory metrics, and the like. For example, the set of hardware metrics may indicate that the server device 100 has 64 GB of RAM and the processing unit 302 having eight cores.

At step 408, the server device 100 may ascertain if the server device 100 is classified as the high-configuration device. For the classification, the server device 100 may determine if each of the set of hardware metrics is higher than a corresponding threshold hardware metrics. For instance, if each of the set of hardware metrics is higher than the corresponding threshold hardware metric, then a complete aggregation of the data source 201-1 may be allowed. For instance, assume that the 2 GB of RAM and two-core processing unit 302 are the threshold hardware metrics. Further, assume that the set of hardware metrics may include 64 GB of RAM and a processing unit 302 having single core. In this regard, it may be ascertained that each of the set of hardware metrics is higher than the corresponding threshold hardware metrics. Therefore, the server device 100 may be classified as the high-configuration device.

If the server device 100 is configured as the high-configuration device, the method 400 may proceed to step 410. If the server device 100 is not configured as the high-configuration device, the method 400 may proceed to step 406.

In some scenarios, even if the server device 100 is a high-configuration device, available hardware resources may still not be sufficient to allow complete aggregation of the data source. For instance, even if the server device 100 is a high-configuration device, some of the hardware resources of the server device 100 may be utilized for various processes, such as for enabling access to already aggregated one or more data sources, already supported in-built processes in the server device 100, and the like. Accordingly, allowing aggregation of data in the server device 100 may result in latency issues and reduce the efficiency of the server device 100 and thereby, leading to crashing of the server device 100 in some scenarios.

For instance, assume that the server device 100 is a virtual machine with 64 GB of RAM and an eight-core processor. Further, assume that the data source 201-2 has already been completely aggregated in the server device 100. Yet further, assume that the higher amount of hardware resources of the server device 100 are utilized for the complete aggregation of the data source 201-2. In this regard, if the data source 201-1 is subsequently completely aggregated, latency issues may occur during operation and efficiency of server device 100 may be reduced.

To ensure proper complete aggregation of the data source 201-1, the method 400 may determine available hardware resources of the server device 100 prior to allowing the complete aggregation of the data source 201-1. Accordingly, at step 410, a set of available hardware metrics corresponding to the server device 100 may be obtained. The set of available hardware metrics corresponds to a hardware configuration of the server device 100 that is available for use. In other words, the set of available hardware metrics may be hardware metrics that are not currently used by the server device 100 for running any processes. Assume that out of 64 GB of RAM and eight-core processing unit 302, 32 GB RAM and four-cores processing unit 302 are currently used by the server device 100 for supporting other processes. Therefore, the server device 100 may determine that 32 GB of RAM and four-cores of processing unit 302 may be available for use and determine that the set of available hardware metrics is 32 GB RAM and four cores of processing unit 302.

Subsequently, at step 412, each of the set of available hardware metrics may be compared with a corresponding threshold hardware metric from a required set of threshold hardware metrics. For the comparison, the server device 100 may determine the required set of threshold hardware metrics. The required set of threshold metrics may correspond to hardware configuration required for the complete aggregation of the data source 201-1. In an example, the server device 100 may determine the required set of threshold hardware metrics by browsing the complete address space of the data source 201-1.

For instance, assume that the data source 201-1 is to be completely aggregated. The server device 100 may browse the complete address space of the data source 201-1 and determine that for the complete aggregation of the data source 201-1, 16 GB of RAM and two cores of processing unit 302 may be required. Accordingly, the required set of threshold metrics is 16 GB of RAM and two cores of processing unit 302.

Upon the determination, the server device 100 may compare the available memory metrics with a required threshold memory metric and the available processing unit metrics with a required threshold processing unit metric. For example, the server device 100 may compare an available memory metric (32 GB of RAM) with the required threshold memory metric (16 GB of RAM). Further, the server device 100 may compare an available processing unit metric (four cores of processing unit 302) with the required threshold processing unit metric (two cores of processing unit 302).

Further, at step 414, the server device 100 may allow the complete aggregation of the data source 201-1 based on the comparison. Particularly, the server device 100 may allow the complete aggregation of the data source 201-1 if each of the set of available hardware metrics is greater than the corresponding threshold hardware metrics from the required set of threshold hardware metrics. For instance, the server device 100 may ascertain that each of the set of available hardware metrics (i.e., 32 GB RAM and four cores of processing unit 302) is greater than the corresponding threshold hardware metric from the required set of threshold hardware metrics (i.e., 16 GB RAM and two cores of processing unit 302). Accordingly, in such a scenario, the server device 100 may allow the complete aggregation of the data source 201-1.

In an example, upon the complete aggregation of the data source 201-1, the server device 100 may trigger an alert to indicate complete aggregation of the data source 201-1. The triggering of the alert may include prompting a message, such as a visual message, using the user interface 314, such as the Graphical User Interface (GUI) on the display 316. In another example, the triggering of the alert may also be in the form of audio alerts, such as a buzzer sound, an alarm, a ring tone, an audio message, and the like using the User Interface 314, such as the GUI, using the speaker 318.

Figure 5:
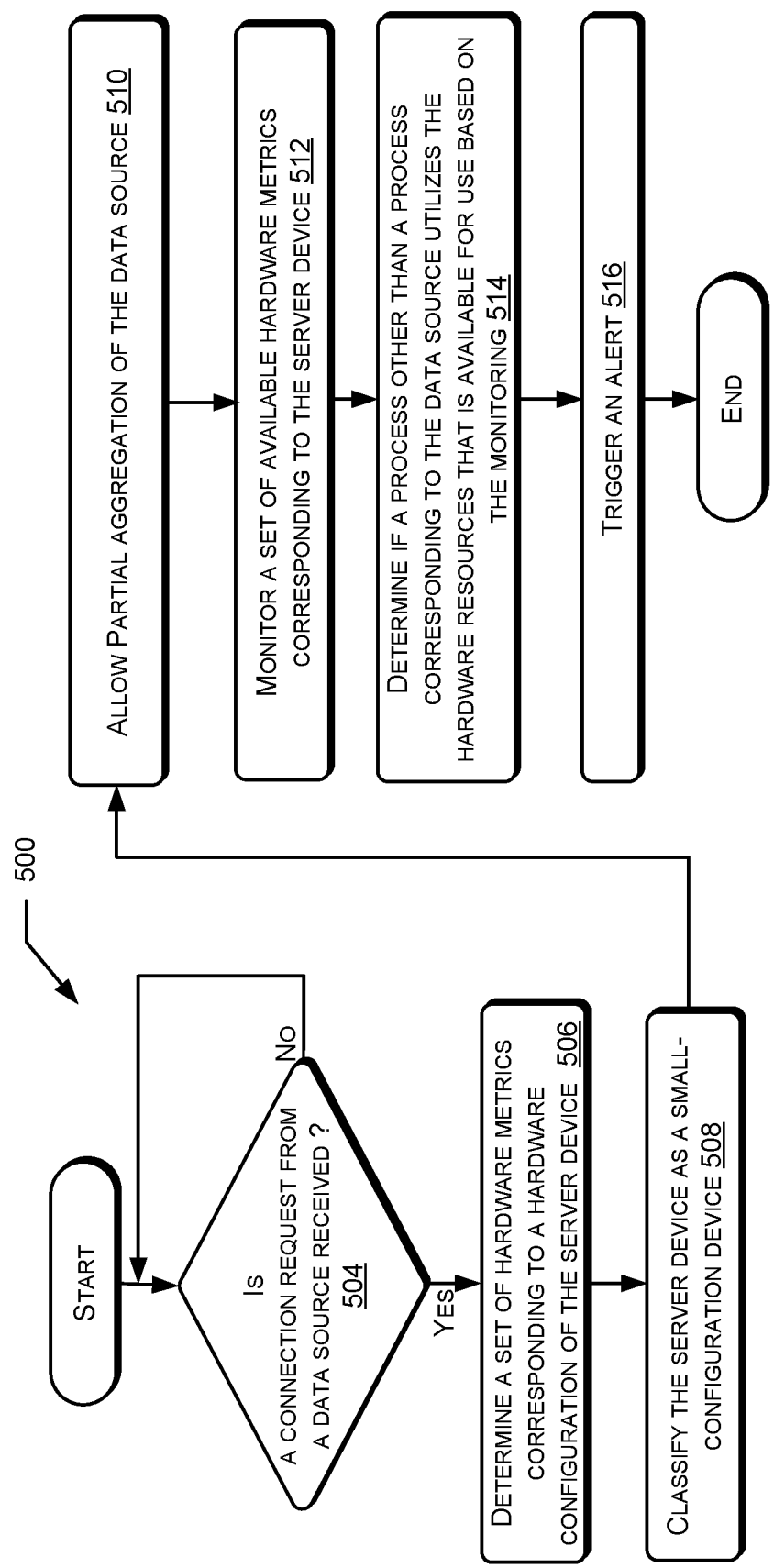
FIG. 5 illustrates a method for optimized aggregation of a data source for a small-configuration device, according to an example implementation of the present subject matter.

FIG. 5 illustrates a method 500 for optimized aggregation of the data source 201-1 for a small-configuration device, according to an example implementation of the present subject matter. The order in which the method 500 is described is not intended to be construed as a limitation, and any number of the described method blocks may be combined in any order to implement the method 500, or an alternative method. Furthermore, the method 500 may be implemented by processor(s) or computing device(s) through any suitable hardware, non-transitory machine-readable instructions, or a combination thereof.

It may be understood that steps of the method 500 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 500 may be performed by the server device 100.

At step 504, the server device 100 may determine if a connection request is received from the data source 201-1. If the connection request is received, then step 506 is performed. If the connection request is not received, then step 504 may be repeated.

At step 506, to enable classification of the server device 100 as a small-configuration device, the server device 100 may determine a set of hardware metrics corresponding to hardware configuration of the server device 100. The determination of the set of hardware metrics may be, for example, performed by hardware metrics determining engine 304. The set of hardware metrics may be, for example, processing unit metrics, memory metrics, and the like.

At step 508, the server device 100 may perform classification of the server device 100 as a small-configuration device. For the classification, the server device 100 may ascertain if at least one of the set of hardware metrics is lesser than a corresponding threshold hardware metrics. For instance, assume that the 2 GB of RAM and two-cores processing unit 302 are the threshold hardware metrics. Further, assume that the set of hardware metrics may include 64 GB of RAM and a processing unit 302 having single core. In this regard, it may be ascertained that the processing unit metric is lesser than the threshold processing unit metric. Accordingly, the server device 100 may be classified as the small-configuration device. The classification of the server device 100 may be performed by the server classification engine.

At step 510, upon classifying the server device 100 as the small-configuration device, the server device 100 may allow partial aggregation of the data source 201-1. In other words, when the server device 100 is classified as the small-configuration device, the server device 100 may only allow partial aggregation of the data source 201-1 and not complete aggregation of the data source 201-1. A specific part of the address space of the data source 201-1 is only aggregated to the server device 100 and may be accessible to a user for fetching the data thereof based on request by the user 136.

In some scenarios, upon allowing the partial aggregation of the data source 201-1, there may be possibilities that the some of the available hardware resources of the server device 100 may be utilized for other processes. In such a scenario, when the user 136 requests data from the partially-aggregated data source 201-1, the process of fetching may take time and thereby, causing latency issues.

In this regard, at step 512, the server device 100 may monitor the set of available hardware metrics corresponding to the server device 100. The set of available hardware metrics corresponds to a hardware configuration of the server device 100 that is available for use. In other words, the set of available hardware metrics may be hardware metrics that are not currently used by the server device 100 for running any processes. Assume that out of 64 GB of RAM and eight-core processing unit 302, 32 GB RAM and four-cores processing unit 302 are currently used by the server device 100 for supporting other processes. Therefore, the server device 100 may determine that 32 GB of RAM and four-cores of processing unit 302 may be available for use.

At step 514, it may be determined if a process other than a process corresponding to the data source 201-1 utilizes the hardware resources that is available for use based on the monitoring. For instance, assume that of the set of available hardware metrics (i.e., 32 GB RAM and four cores of processing unit 302), 16 GB RAM and two cores of processing unit 302 are being used by processes other the process corresponding to the data source 201-1.

At step 516, in response to the determination that a process other a process corresponding to the data source 201-1 utilizes the hardware resources of the server device 100 that is available for use, the server device 100 may trigger an alert. The alert may indicate that the hardware resources that is available for use are being used by the process other than the process corresponding to the data source 201-1. The triggering of the alert may include prompting a message, such as a visual message, using the user interface 314, on the display 316. In an example, the prompting of the message may be performed using the User Interface 314, such as the GUI. In another example, the triggering of the alert may also be in the form of audio alerts, such as a buzzer sound, an alarm, a ring tone, an audio message, and the like, using the User interface 314 through the speaker 318.

Although in the above examples, unless otherwise explicitly referred to the second data source 201-2, the data source has been explained with reference to the first data source 201-1. However, it may be understood that the data source can be explained with reference to other data sources, such as the second data source 201-2 and the third data source 201-3.

Figure 6A:
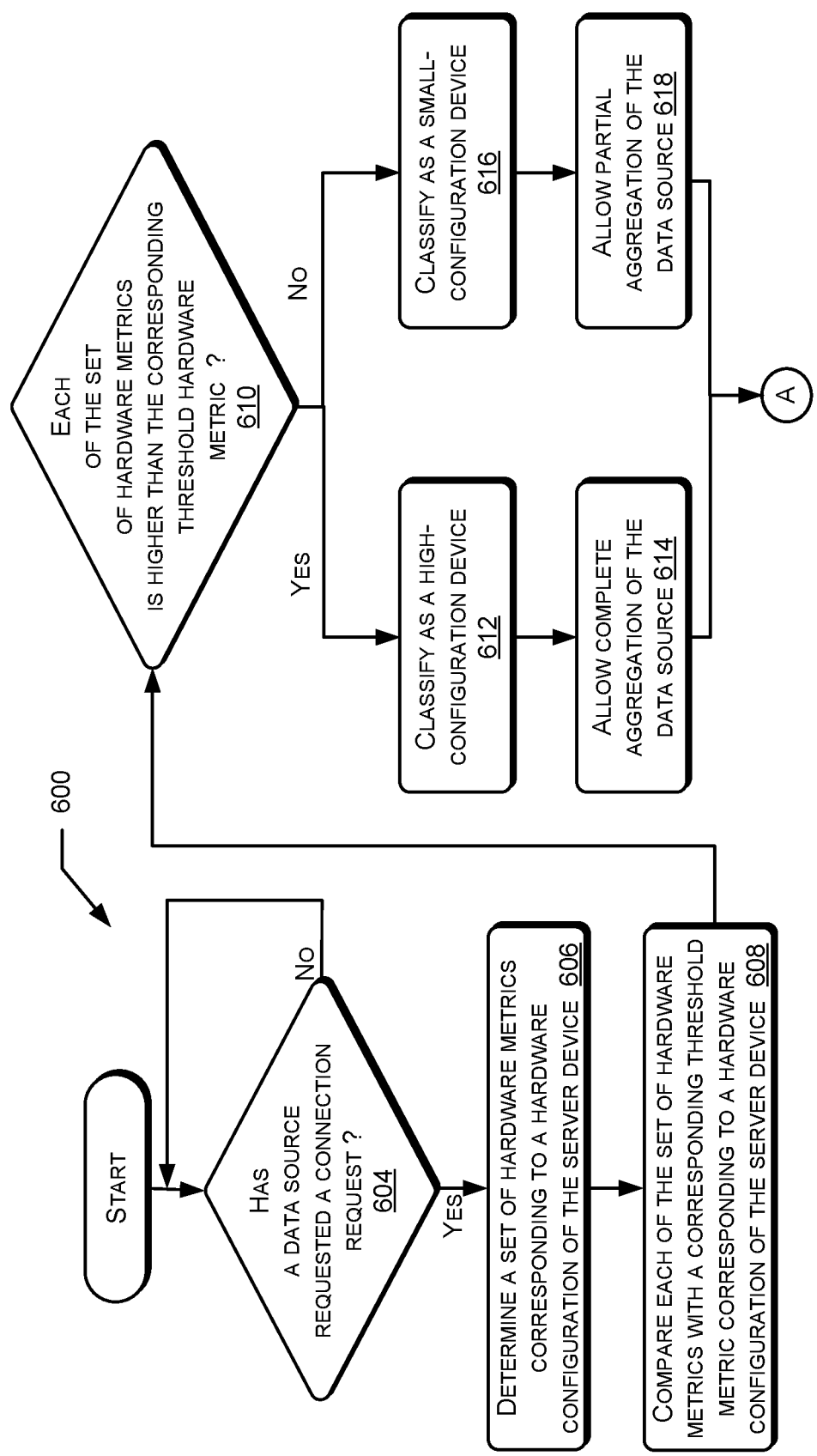
FIGS. 6a-6b illustrate a method for optimized aggregation of a data source, according to an example implementation of the present subject matter.
Figure 6B:
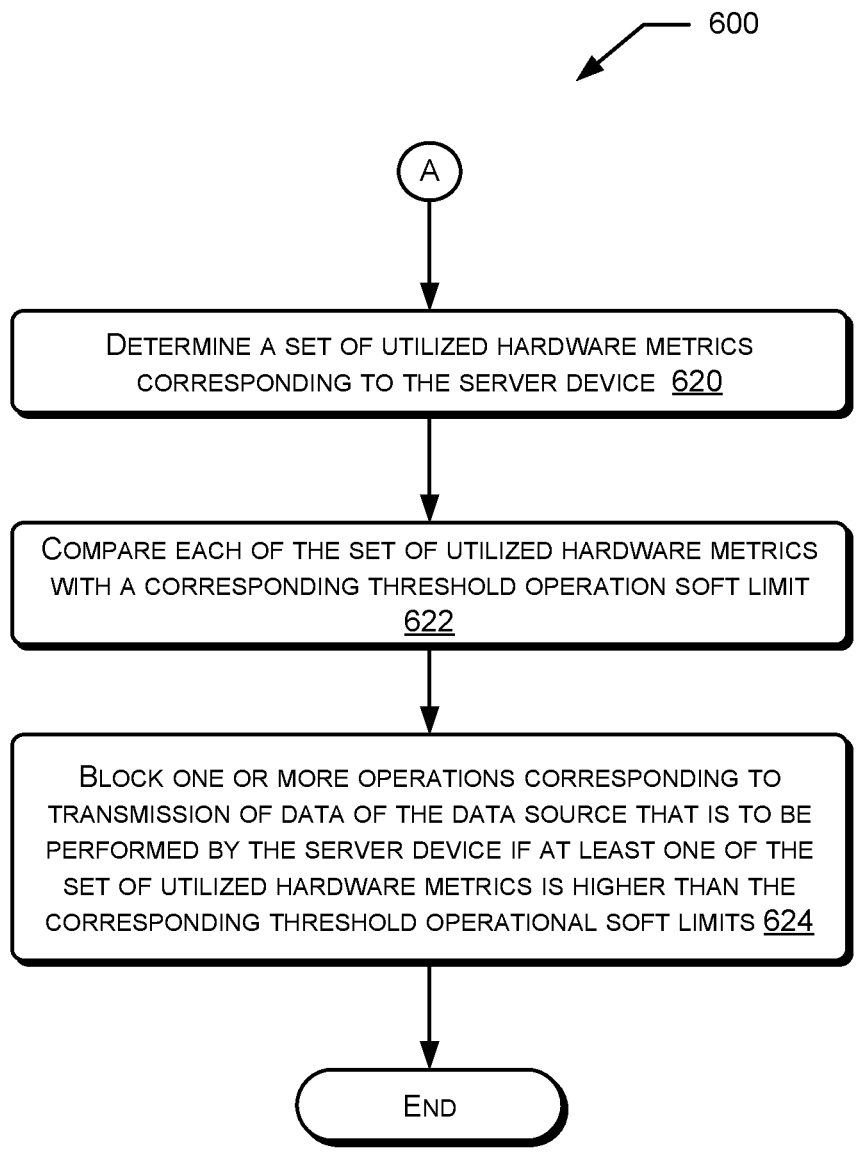

FIGS. 6a-6b illustrate a method 600 for optimized aggregation of data sources, according to an example implementation of the present subject matter. The order in which the method 600 is described is not intended to be construed as a limitation, and any number of the described method blocks may be combined in any order to implement the method 600, or an alternative method. Furthermore, the method 600 may be implemented by processor(s) or computing device(s) through any suitable hardware, non-transitory machine-readable instructions, or a combination thereof.

It may be understood that steps of the method 600 may be performed by programmed computing devices and may be executed based on instructions stored in a non-transitory computer readable medium. The non-transitory computer readable medium may include, for example, digital memories, magnetic storage media, such as magnetic disks and magnetic tapes, hard drives, or optically readable digital data storage media. In an example, the method 600 may be performed by the server device 100.

At step 604, it may be determined if a data source has requested a connection request to a server device. The connection request may be to transmit the data from the data source or to provide access to the data from the data source to a user. The server device may correspond to the server device 100. The data source may correspond to the data source 201-1, 201-2, 201-3.

At step 606, the hardware configuration of the server device may be determined. Particularly, a set of hardware metrics that correspond to the hardware configuration of the server may be determined. The set of hardware metrics may be, for example, processing unit metrics, memory metrics, and the like. For example, the set of hardware metrics may indicate that the server device has 64 GB of RAM and a processing unit having eight cores.

At step 608, each of the set of hardware metrics may be compared with a corresponding threshold metric. For instance, a processing unit metric may be compared with the threshold processing unit metric and the memory metric may be compared with the threshold memory unit metric.

At step 610, it may be ascertained that if each of the set of hardware metrics is higher than the corresponding threshold hardware metric. If it is determined that each of the set of hardware metrics is higher than the corresponding threshold hardware metric, then the method 600 proceeds to step 612. At step 612, the server device may be classified as a high-configuration device. Subsequently, at step 614, a complete aggregation of the data source may be allowed. The complete aggregation of the data source may correspond to the addition of the complete address space of the data source for the transmission of the data from the complete address space of the data source. For instance, assume that the 2 GB of RAM and two-core processing unit are the threshold hardware metrics. Further, assume that the set of hardware metrics may include 64 GB of RAM and a processing unit having eight cores. In this regard, it may be ascertained that each of the set of hardware metrics is higher than the corresponding threshold hardware metrics. Therefore, the server device may be classified as the high-configuration device and complete aggregation of the data source may be allowed. The processing unit may correspond to the processing unit 302.

On the other hand, if, at step 610, it is determined the each of the set of hardware metrics is not higher than the corresponding threshold hardware metric, then method 600 may proceed to step 616. In other words, if at least one of the set of hardware metrics is lesser than the corresponding threshold hardware metric, the method 600 may proceed to step 616.

At step 616, the server device may be classified as a small-configuration device. Further, at step 618, partial aggregation of the data source may be allowed. The partial aggregation of the data source may correspond to addition of a specific part of the address space of the data source for transmission of the data from the specific part of the address space of the data source. In other words, based on a request of a user, a specific part of the data source address space may be allowed for browsing. In an example, for the partial aggregation of the data source, the method 600 includes adding the specific part of the address space of the at data source for transmission of the data from the data source without browsing the address space of the data source.

For instance, assume that the 2 GB of RAM and two-core processing unit are the threshold hardware metrics. Further, assume that the set of hardware metrics may include 64 GB of RAM and a processing unit having single core. In this regard, it may be ascertained that at least one of the set of hardware metrics (i.e., processing unit having single core) is lesser than the corresponding threshold hardware metrics (i.e., processing unit having two cores) and therefore, the server device may be classified as the small-configuration device and only partial aggregation of the data source may be allowed.

Upon allowing the complete aggregation of the data source or the partial aggregation of the data source, use of hardware resources of the server device for the transmission of the data may be continuously monitored. Accordingly, upon allowing the complete aggregation or the partial aggregation of the data source, the method 600 may perform the step 620.

Referring to FIG. 6b, at step 620, a set of utilized hardware metrics corresponding to the server device may be determined. The set of utilized hardware metrics may correspond to hardware resources of the server device that is being utilized. For instance, assume that the of the set of hardware metrics (64 GB RAM and eight cores of processing unit). Of that, assume that 56 GB RAM and six cores of processing unit are currently being utilized. The server device may determine that 56 GB RAM and six cores of processing unit as the set of utilized hardware metrics.

At step 622, each of the set of utilized hardware metrics may be compared with a corresponding threshold operational soft limit. The threshold operational soft limit may indicate a limit corresponding to the hardware configuration of the server device beyond which usage of the hardware resources of the server device for a predetermined time causes malfunctioning of the server device. Assume that 32 GB RAM and four cores of processing unit are threshold operational soft limit and set of utilized hardware metrics (56 GB RAM and six cores of processing unit) are compared.

At step 624, one or more operations corresponding to the transmission of data of the data source that is to be performed by the server device may be blocked if at least one of the set of utilized hardware metrics is higher than the corresponding threshold operational soft limit of the set of threshold operational soft limit. In particular, the server device may block resource intensive operations, such as exporting address space where file operation is involved, and the like. Assume that 32 GB RAM and four cores of processing unit are threshold operational soft limit and set of utilized hardware metrics (56 GB RAM and six cores of processing unit). In this regard, one or more operations corresponding to the transmission of the data of the data source may be blocked since at least one of the set of utilized hardware metrics is higher than the corresponding threshold operational soft limit of the set of threshold operational soft limits.

On the other hand, the server device may continue allowing the transmission of the data corresponding to the complete address space of the data source if each of the set of utilized hardware metrics is lesser than the corresponding threshold operational soft limit. Assume that 56 GB RAM and six cores of processing unit are threshold operational soft limit and set of utilized hardware metrics (32 GB RAM and four cores of processing unit). In this regard, the method 600 includes continuing to allow the transmission of the data corresponding to the complete address space of the data source since each of the set of utilized hardware metrics is lesser than the corresponding threshold operational soft limits.

In an example, prior to allowing the complete aggregation of the data source, the method 600 includes obtaining a set of available hardware metrics corresponding to the server device. The set of available hardware metrics may correspond to a hardware configuration of the server device that is available for use. The complete address space of the data source may be browsed. A required set of threshold hardware metrics may be determined based on the browsing. The required set of threshold hardware metrics correspond to hardware configuration required for the complete aggregation of the data source. Each of the set of available hardware metrics may be compared with the corresponding threshold hardware metric from the required set of threshold hardware metrics. Lack of the required set of threshold hardware metrics for the complete aggregation of the data source may be indicated if at least one of the set of available hardware metrics is lesser than the corresponding threshold hardware metric from the required set of threshold hardware metrics. In an example, the indication of lack of the required set of threshold hardware metrics may include causing, by the server device, a user interface to indicate required update in the hardware configuration of the server device to allow the complete aggregation of the data source.

On the other hand, upon the comparison of each of the set of available hardware metrics with a corresponding hardware metric from the required set of threshold hardware metrics, the complete aggregation of the data source may be allowed if each of the set of available hardware metrics is greater than the corresponding threshold hardware metric from the required set of threshold hardware metrics.

Upon allowing the complete aggregation of the data source, the method 600 includes monitoring a set of available hardware metrics corresponding to the server device. The set of available hardware metrics corresponds to a hardware resources of the server device that is available for use. It may be determined if a process other than a process corresponding to the data source utilizes the hardware resources that is available for use based on the monitoring. An alert may be triggered to indicate that the hardware resources that is available for use are being used by the process other than the process corresponding to the data source.

In an example, triggering the alert may include prompting the alert in form of a visual message using a user interface to indicate that the hardware resources that is available for use are being used by the process other than the process corresponding to the data source. The alert may be provided on a display. The user interface may correspond to the user interface 314 and the display may correspond to the display 316. In another example, the triggering of the alert may include prompting the alert in the form of a sound, such as a buzzer sound, an alarm, a ring tone, an audio message, and the like, to indicate that the hardware resources that is available for use are being used by the process other than the process corresponding to the data source. The alert may be provided using the User Interface through a speaker. The speaker may correspond to the speaker 318.

FIG. 7 illustrates a computing environment, implementing a non-transitory computer-readable medium for optimized aggregation of data sources, according to an example implementation of the present subject matter.

In an example, the non-transitory computer-readable medium 702 may be utilized by the server device 703. The server device 703 may correspond to the server device 100. The server device 703 may be implemented in a public networking environment or a private networking environment. In an example, the computing environment 700 may include a processing resource 704 communicatively coupled to the non-transitory computer-readable medium 702 through a communication link 706.

In an example, the processing resource 704 may be implemented in a device, such as the server device 703. The processing resource 704 may be the processing unit 302. The non-transitory computer-readable medium 702 may be, for example, an internal memory device of the server device 703 or an external memory device. In an implementation, the communication link 706 may be a direct communication link, such as any memory read/write interface. In another implementation, the communication link 706 may be an indirect communication link, such as a network interface. In such a case, the processing resource 704 may access the non-transitory computer-readable medium 702 through a network 708. The network 708 may be a single network or a combination of multiple networks and may use a variety of different communication protocols. The processing resource 704 and the non-transitory computer-readable medium 702 may also be communicatively coupled to the server device 703 over the network 708.

In an example implementation, the non-transitory computer-readable medium 702 includes a set of computer-readable instructions to perform optimized aggregation of a data source. The set of computer-readable instructions can be accessed by the processing resource 704 through the communication link 706 and subsequently executed to perform acts to provide feedback to the actuating object.

Referring to FIG. 7, in an example, the non-transitory computer-readable medium 702 includes instructions 712 to receive a connection request from a data source for aggregating thereof and for transmitting data from the data source. The data source may correspond to the data source. The data source may correspond to the data source 201-1, 201-2, 201-3.

The non-transitory computer-readable medium 702 includes instructions 714 to determine a set of hardware metrics corresponding to a hardware configuration of a server device. The determination of the set of hardware metrics may be similar to the determination of the set of hardware metrics as explained with reference to FIG. 4-6b.

The non-transitory computer-readable medium 702 includes instructions 716 to compare each of the set of hardware metrics with a corresponding threshold hardware metric. The comparison of the hardware metrics with the corresponding threshold hardware metric may be similar to the comparison as explained with reference to FIG. 4-6b.

The non-transitory computer-readable medium 702 includes instructions 718 to allow a complete aggregation of the data source with the server device if each of the set of hardware metrics is greater than the corresponding threshold hardware metric or a partial aggregation of the data source with the server device if at least one of the set of hardware metrics is lesser than the corresponding threshold hardware metric. The complete aggregation of the data source indicates addition of complete address space access of the data source to enable transmission of the data corresponding to the complete address space of the data source. The partial aggregation of the data source indicates addition of a specific part of the address space of the data source to enable transmission of the data corresponding to the specific part of the address space. The complete aggregation or the partial aggregation of the data source is similar to the complete aggregation of the data source as explained with reference to FIG. 4 or the partial aggregation of the data source as explained with reference to FIG. 5 respectively.

The non-transitory computer-readable medium 702 includes instructions 720 to determine a set of utilized hardware metrics corresponding to the server device upon allowing the complete aggregation of the data source or the partial aggregation of the data source. The set of utilized hardware metrics corresponds to a hardware resources of the server device that is currently being used. The determination of the set of utilized hardware metrics is similar to the determination of the set of utilized hardware metrics as explained with reference to FIG. 6b.

The non-transitory computer-readable medium 702 includes instructions 722 to compare each of the set of utilized hardware metrics with a corresponding threshold operational soft limit, as is explained with reference to FIG. 6b. The threshold operational soft limit indicates a limit corresponding to the hardware configuration of the server device beyond which usage of the hardware resources of the server device for a predetermined time causes malfunctioning of the server device.

The non-transitory computer-readable medium 702 includes instructions 724 to ascertain if at least one of the set of utilized hardware metrics is higher than the corresponding threshold operational soft limit based on the comparison.

The non-transitory computer-readable medium 702 includes instructions 726 to block one or more operations corresponding to the transmission of data of the data source that is to be performed by the server device based on the ascertaining. The non-transitory computer-readable medium 702 includes instructions 728 to trigger an alert corresponding to blocking of the one or more operations, in response to the blocking of the one or more operations. The triggering of the alert may be similar to the triggering of the alert as explained with reference to FIGS. 6a and 6b.

For triggering the alert, the non-transitory computer-readable medium 702 includes instructions to prompt, using a user interface, an indication corresponding to the blocking of the one or more operations in the form visual message. The user interface may correspond to the user interface 314.

In an example, the visual message may be provided through a display, such as the display 316.

Upon comparing each of the set of utilized hardware metrics, the non-transitory computer-readable medium 702 includes instructions to ascertain if each of the set of utilized hardware metrics is lesser than the corresponding threshold operational soft limit based on the comparison. The non-transitory computer-readable medium includes instructions to continue allowing the transmission of the data corresponding to the complete address space of the data source based on the ascertaining that each of the set of utilized hardware metrics is lesser than the corresponding threshold operational soft limit.

The non-transitory computer-readable medium 702 includes instructions to trigger, using the user interface, an alert indicating the complete aggregation of the data source in response to the allowing of the complete aggregation of the date source. The non-transitory computer-readable medium 702 includes instructions to trigger, using the user interface, an alert indicating the partial aggregation of the data source in response to the allowing of the partial aggregation of the data source.

Although in the above examples, the set of hardware metrics are explained to be determined by the server device 100, the server device 100 may already be pre-loaded with the data corresponding to the set of hardware metrics or the data corresponding to the set of hardware metrics may be readily known to the server device.

Although in the above examples, the classification of the server device 100 as the high-configuration device or the small-configuration device is explained to be performed upon receipt of the connection request from the data source, the classification may be performed before the receipt of connection request from the data source.

The present subject matter provides an efficient and reliable techniques for optimized aggregation of data sources. In accordance with the present subject matter, data sources may be aggregated based on hardware configuration in which a server device for data source aggregation is implemented. Therefore, the present subject matter enables higher scalability, performance and reliability of the server device that is to perform data source aggregation. Since the aggregation is based on the hardware configuration, the present subject matter prevents decreased efficiency, latency issues, lesser performance, and heat generation during the operation caused due to aggregation of higher number of data sources to a server device implemented on the small-configuration device. Therefore, the present subject matter prevents crashing of the server device. Further, the present subject matter prevents wastage of resources that is caused due to aggregation of lesser number of data sources to a server device implemented on a high-configuration device.

Although examples and implementations of present subject matter have been described in language specific to structural features and/or methods, it is to be understood that the present subject matter is not necessarily limited to the specific features or methods described. Rather, the specific features and methods are disclosed and explained in the context of a few example implementations of the present subject matter.

What is claimed is:

1. A server device for optimized aggregation of a data source, the server device comprising:
 a processing unit to:
  receive a connection request from a data source for aggregating thereof and for transmitting data from the data source;

determine a set of hardware metrics corresponding to a hardware configuration of the server device;

compare each of the set of hardware metrics with a corresponding threshold hardware metric;

classify the server device as one of: a small-configuration device and a high-configuration device based on the comparison;

allow complete aggregation of the data source or partial aggregation of the data source based on the classification, wherein the complete aggregation of the data source indicates addition of complete address space access of the data source to enable transmission of the data corresponding to the complete address space of the data source, and wherein the partial aggregation of the data source indicates addition of a specific part of the address space of the data source to enable transmission of the data corresponding to the specific part of the address space;

determine a set of utilized hardware metrics corresponding to the server device upon allowing one of: the complete aggregation of the data source and the partial aggregation of the data source, wherein the set of utilized hardware metrics corresponds to hardware resources of the server device that is being utilized;

compare each of the set of utilized hardware metrics with a corresponding threshold operational soft limit, wherein the threshold operational soft limit indicates a limit corresponding to the hardware configuration of the server device beyond which usage of the hardware resources of the server device for a predetermined time causes malfunctioning of the server device; and block one or more operations corresponding to the transmission of data of the data source that is to be performed by the server device if at least one of the set of utilized hardware metrics is higher than the corresponding threshold operational soft limit.

2. The server device of claim 1, wherein if each of the set of hardware metrics is greater than the corresponding threshold hardware metric, the processing unit is to:

classify the server device as the high-configuration device based on the comparison of each of the set of hardware metrics with the corresponding threshold hardware metric; and allow the complete aggregation of the data source based on the classification.

3. The server device of claim 1, wherein if at least one of the set of hardware metrics is lesser than the corresponding threshold hardware metric, the processing unit is to:

classify the server device as the small-configuration device based on the comparison based on the comparison of each of the set of hardware metrics with a corresponding threshold hardware metric; and allow the partial aggregation of the data source based on the classification.

4. The server device of claim 1, wherein prior to allowing the complete aggregation of the data source, the processing unit is to:

obtain a set of available hardware metrics corresponding to the server device, wherein the set of available hardware metrics corresponds to a hardware configuration of the server device that is available for use;

browse the complete address space of the data source;

determine a required set of threshold hardware metrics based on the browsing, wherein the required set of threshold hardware metrics correspond to hardware configuration required for the complete aggregation of the data source; and compare each of the set of available hardware metrics with a corresponding threshold hardware metric from the required set of threshold hardware metrics; and allow the complete aggregation of the data source if each of the set of available hardware metrics is greater than the corresponding threshold hardware metric from the required set of threshold hardware metrics.

5. The server device of claim 4, wherein upon the comparison of each of the set of available hardware metrics with a corresponding threshold hardware metric from the required set of threshold hardware metrics, the processing unit is to:

trigger an alert to indicate lack of the required set of hardware metrics for the complete aggregation of the data source if at least one of the set of available hardware metrics is lesser than the corresponding threshold hardware metric from the required set of threshold hardware metrics.

6. The server device of claim 1, wherein the processing unit is to allow the partial aggregation of the data source without browsing the address space of the data source.

7. The server device of claim 1, wherein the server device is an Open Platform Communication Unified Architecture (OPCUA)-based data aggregator to collect data from a plurality of data sources for transmission thereof.

8. The server device of claim 1, wherein upon allowing the partial aggregation of the data source, the processing unit is to:

monitor a set of available hardware metrics corresponding to the server device, wherein the set of available hardware metrics corresponds to a hardware resources of the server device that is available for use;

determine if a process other than a process corresponding to the data source utilizes the hardware resources that is available for use based on the monitoring; and trigger an alert to indicate that the hardware resources that is available for use are being used by the process other than the process corresponding to the data source.

9. The server device of claim 1, wherein upon comparing each of the set of utilized hardware metrics with the corresponding threshold operational soft limit, the processing unit is to continue allowing the transmission of the data corresponding to the complete address space of the data source if each of the set of utilized hardware metrics is lesser than the corresponding threshold operational soft limit of the set of threshold operational soft limits.

10. A method for optimized aggregation of a data source, the method comprising:

requesting, by a data source, connection with a server device for aggregating and transmitting data from the data source;

determining, by the server device, a set of hardware metrics corresponding to a hardware configuration of the server device upon receiving the request;

comparing, by the server device, each of the set of hardware metrics with a corresponding threshold hardware metric;

classifying, by the server device, the server device as one of: a high-configuration device based on the comparison if each of the set of hardware metrics is greater than the corresponding threshold hardware metric, and a small-configuration device if at least one of the set of hardware metrics is lesser than the corresponding threshold hardware metric;

allowing, by the server device, one of: complete aggregation of the data source based on the classification as the high-configuration device and partial aggregation of the data source based on the classification as the small-configuration device, wherein the complete aggregation of the data source indicates addition of complete address space access of the data source to enable transmission of the data corresponding to the complete address space of the data source, and wherein the partial aggregation of the data source indicates addition of a specific part of the address space of the data source to enable transmission of the data corresponding to the specific part of the address space;

determining, by the server device, a set of utilized hardware metrics corresponding to the server device upon allowing one of: the complete aggregation of the data source and the partial aggregation of the data source, wherein the set of utilized hardware metrics corresponds to hardware resources of the server device that is being utilized;

comparing, by the server device, each of the set of utilized hardware metrics with a corresponding threshold operational soft limit, wherein the threshold operational soft limit indicates a limit corresponding to the hardware configuration of the server device beyond which usage of the hardware resources of the server device for a predetermined time causes malfunctioning of the server device; and blocking, by the server device, one or more operations corresponding to the transmission of data of the data source that is to be performed by the server device if at least one of the set of utilized hardware metrics is higher than the corresponding threshold operational soft limit.

11. The method of claim 10, wherein prior to allowing the complete aggregation of the data source, the method comprises:

obtaining, by the server device, a set of available hardware metrics corresponding to the server device, wherein the set of available hardware metrics corresponds to a hardware configuration of the server device that is available for use;

browsing, by the server device, the complete address space of the data source;

determining, by the server device, a required set of threshold hardware metrics based on the browsing, wherein the required set of threshold hardware metrics correspond to hardware configuration required for the complete aggregation of the data source; and comparing, by the server device, each of the set of available hardware metrics with the corresponding threshold hardware metric from the required set of threshold hardware metrics; and indicating, by the server device, lack of the required set of threshold hardware metrics for the complete aggregation of the data source if at least one of the set of available hardware metrics is lesser than the corresponding threshold hardware metric from the required set of threshold hardware metrics.

12. The method of claim 11, wherein the indication by the server device comprises:

causing, by the server device, a user interface to indicate required update in the hardware configuration of the server device to allow the complete aggregation of the data source.

13. The method of claim 11, wherein upon the comparison of each of the set of available hardware metrics with a corresponding hardware metric from the required set of threshold hardware metrics, the method comprises:

allowing, by the server device, the complete aggregation of the data source if each of the set of available hardware metrics is greater than the corresponding threshold hardware metric from the required set of threshold hardware metrics.

14. The method of claim 10, wherein the partial aggregation of the data source comprises:

adding, by the server device, the specific part of the address space of the data source for the transmission of the data from the data source without browsing the address space of the data source.

15. The method of claim 10, wherein upon allowing the complete aggregation of the data source, the method comprises:

monitoring, by the server device, a set of available hardware metrics corresponding to the server device, wherein the set of available hardware metrics corresponds to a hardware resources of the server device that is available for use;

determining, by the server device, if a process other than a process corresponding to the data source utilizes the hardware resources that is available for use based on the monitoring; and triggering, by the server device, an alert to indicate that the hardware resources that is available for use are being used by the process other than the process corresponding to the data source.

16. The method as claimed in claim 15, wherein the triggering the alert comprises:

prompting, by the server device, the alert in form of a visual message using a user interface to indicate that the hardware resources that is available for use are being used by the process other than the process corresponding to the data source.

17. A non-transitory computer-readable medium comprising instructions for optimized aggregation of a data source, the instructions being executable by a processing resource to:

receive a connection request from a data source for aggregating thereof and for transmitting data from the data source;

determine a set of hardware metrics corresponding to a hardware configuration of a server device;

compare each of the set of hardware metrics with a corresponding threshold hardware metric;

allow one of: a complete aggregation of the data source with the server device if each of the set of hardware metrics is greater than the corresponding threshold hardware metric, and a partial aggregation of the data source with the server device if at least one of the set of hardware metrics is lesser than the corresponding threshold hardware metric, wherein the complete aggregation of the data source indicates addition of complete address space access of the data source to enable transmission of the data corresponding to the complete address space of the data source, and wherein the partial aggregation of the data source indicates addition of a specific part of the address space of the data source to enable transmission of the data corresponding to the specific part of the address space;

determine a set of utilized hardware metrics corresponding to the server device upon allowing one of: the complete aggregation of the data source and the partial aggregation of the data source, wherein the set of utilized hardware metrics corresponds to a hardware resources of the server device that is currently being used;

compare each of the set of utilized hardware metrics with a corresponding threshold operational soft limit, wherein the threshold operational soft limit indicates a limit corresponding to the hardware configuration of the server device beyond which usage of the hardware resources of the server device for a predetermined time causes malfunctioning of the server device; and ascertain if at least one of the set of utilized hardware metrics is higher than the corresponding threshold operational soft limit based on the comparison; and block one or more operations corresponding to the transmission of data of the data source that is to be performed by the server device based on the ascertaining; and trigger an alert corresponding to blocking of the one or more operations, in response to the blocking of the one or more operations.

18. The non-transitory computer-readable medium of claim 17, wherein for triggering the alert, the instructions being executable by the processing resource to:

prompt, using a user interface, an indication corresponding to the blocking of the one or more operations in form visual message.

19. The non-transitory computer-readable medium of claim 17, wherein upon comparing each of the set of utilized hardware metrics, the instructions being executable by the processing resource to:

ascertain if each of the set of utilized hardware metrics is lesser than the corresponding threshold operational soft limit based on the comparison; and continue allowing the transmission of the data corresponding to the complete address space of the data source based on the ascertaining that each of the set of utilized hardware metrics is lesser than the corresponding threshold operational soft limit.

20. The non-transitory computer-readable medium of claim 17, the instructions being executable by the processing resource to:

trigger, using a user interface, an alert indicating the complete aggregation of the data source in response to the allowing of the complete aggregation of the data source; and triggering, using the user interface, an alert indicating the partial aggregation of the data source in response to the allowing of the partial aggregation of the data source.

* * * * *